(12) United States Patent
Kalenda

(10) Patent No.: US 11,775,903 B1
(45) Date of Patent: Oct. 3, 2023

(54) SYSTEM AND METHOD FOR LIMITING PROJECT MANAGEMENT RISK

(71) Applicant: Charles Schwab & Co., Inc., Westlake, TX (US)

(72) Inventor: Ellie Kalenda, San Jose, CA (US)

(73) Assignee: Charles Schwab & Co., Inc., Westlake, TX (US)

( * ) Notice: Subject to any disclaimer, the term of this patent is extended or adjusted under 35 U.S.C. 154(b) by 0 days.

(21) Appl. No.: 17/724,245

(22) Filed: Apr. 19, 2022

Related U.S. Application Data

(63) Continuation of application No. 12/586,240, filed on Sep. 18, 2009, now Pat. No. 11,308,434.

(51) Int. Cl.
*G06Q 10/10* (2023.01)
*G06Q 10/06* (2023.01)
*G06Q 10/0635* (2023.01)
*G06Q 10/063* (2023.01)

(52) U.S. Cl.
CPC ......... *G06Q 10/0635* (2013.01); *G06Q 10/06* (2013.01); *G06Q 10/063* (2013.01); *G06Q 10/103* (2013.01)

(58) Field of Classification Search
None
See application file for complete search history.

(56) References Cited

U.S. PATENT DOCUMENTS

| 6,161,113 | A | * | 12/2000 | Mora | G06F 8/20 715/234 |
| 7,756,816 | B2 | * | 7/2010 | Scott | G06Q 10/04 707/999.102 |

* cited by examiner

*Primary Examiner* — Andrew B Whitaker
(74) *Attorney, Agent, or Firm* — Harness, Dickey & Pierce, P.L.C.

(57) ABSTRACT

A system and method assigns documents to a list of documents for a project team to complete based on the level of each of various risks the project is identified to have, and whether the benefits of risk containment afforded by each document outweighs the cost of completion of the document when the risk or risks addressed by the document are at the level identified for the project.

15 Claims, 4 Drawing Sheets

SYSTEM AND METHOD FOR LIMITING PROJECT MANAGEMENT RISK

RELATED APPLICATION

This application is a continuation of U.S. patent application Ser. No. 12/586,240 entitled "System and Method for Limiting Project Management Risk", filed by Ellie Kalinda on Sep. 18, 2009, having the same assignee as the present application, and is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer software for minimizing project risk.

BACKGROUND OF THE INVENTION

All projects have risks. The degree of risk is dependent on the project. For example, a project without a high degree of measurable benefits may have a risk that the expected benefits of the parties for whom the project is being implemented are not realized when the project is completed.

Documents may be used to assist a project team in minimizing certain risks. In the above example, a document that describes the expected benefits may be written and agreed to by the party or parties for whom the project is being implemented, or the document may contain steps that can be taken to make the expected benefits measurable.

Project teams may be expected to minimize risks of their projects, but are frequently left without any structured guidance for doing so. Existing solutions may just use a one-size-fits-all approach, where the project team members are expected to fill out every document on a list of documents, some of which may or may not address project risk. This solution is suboptimal in that the project team devotes time to filling out documents with only marginal risk reduction benefits for a specific project.

Some solutions, such as that addressed by U.S. Pat. No. 6,161,113 base the documents to be filled out on the type of project, for example, where all computer projects use the same set of documents. U.S. Pat. No. 7,058,660 allows the user to enter unspecified project risk, but doesn't utilize the risk information to assist the user in minimizing those risks.

What is needed is a system and method for assisting a project team in minimizing project risks by selecting appropriate documents.

SUMMARY OF INVENTION

A system and method receives categories of risks and one or more risks in each category. Scenarios are received for each risk that correspond to different levels of risk, such as high, medium or low. One or more documents, or their names, are received for each risk that can serve to help contain or minimize the risk for projects most nearly corresponding to the scenario for the highest level of such risk. Additionally, an indication is received as to whether the document or documents for the highest level of risk should be used for other levels of that risk, based on a cost benefit analysis. A baseline set of documents may be received or identified that can apply to all projects. The documents identified or received as described above are assigned to one of several project life cycles. Scores are assigned to each level of each risk, or a uniform scoring system, for example, assigning a score of 1, 3 or 9 to low, medium or high levels of every risk, may be used.

To use the system, for each risk category, the name of the risk category and for each risk corresponding to the risk category, the name of each risk, are displayed to a user, who may be an individual or a project team. The scenarios for each risk are displayed and the user is allowed to select one scenario for each risk that most closely approximates the project whose risks are being analyzed. The names of the documents that were selected to contain the risks as described above and that were assigned to the level of risk corresponding to the scenario selected are displayed, organized by the life cycle to which the documents correspond. The total project score is also displayed. The user or team may add additional documents or may indicate that they do not feel a document, displayed as described above, should be used and the reason why they feel that way. Any or all of the score and the list of documents, including any added as described above, as well as the explanations, are published to one or more managers of the team. The managers may compare the score with a threshold, and provide additional attention and require additional reports from, development teams with a score above the threshold.

DETAILED DESCRIPTION OF A PREFERRED EMBODIMENT

Figure 1:
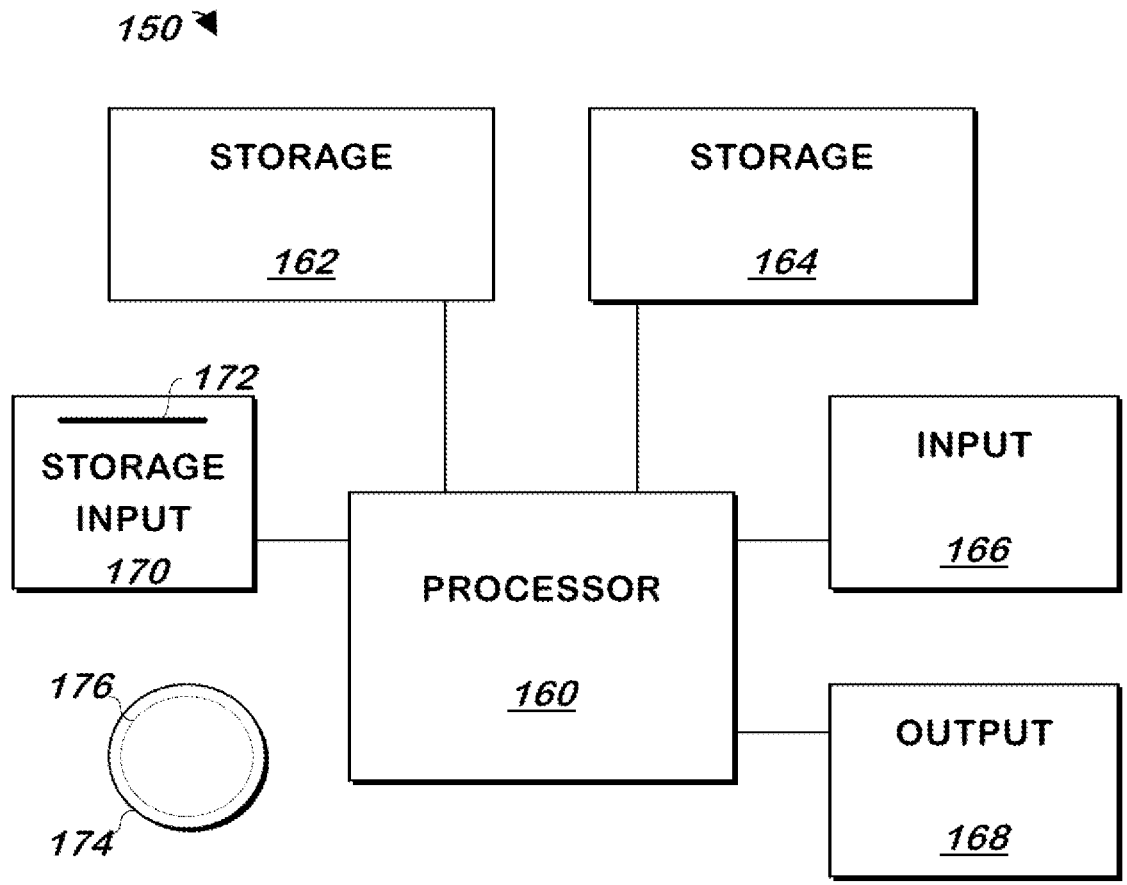
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from MOZILLA FOUNDATION CORPORATION of Mountain View, Calif. or INTERNET EXPLORER browser commercially available from MICROSOFT above, although other systems may be used.

Figure 2:
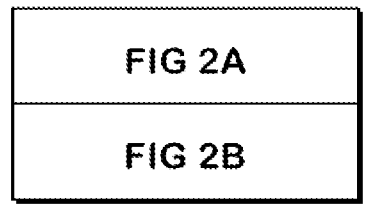
FIG. 2, consisting of FIGS. 2A and 2B, is a flowchart illustrating a method of containing project risk according to one embodiment of the present invention.
Figure 2A:
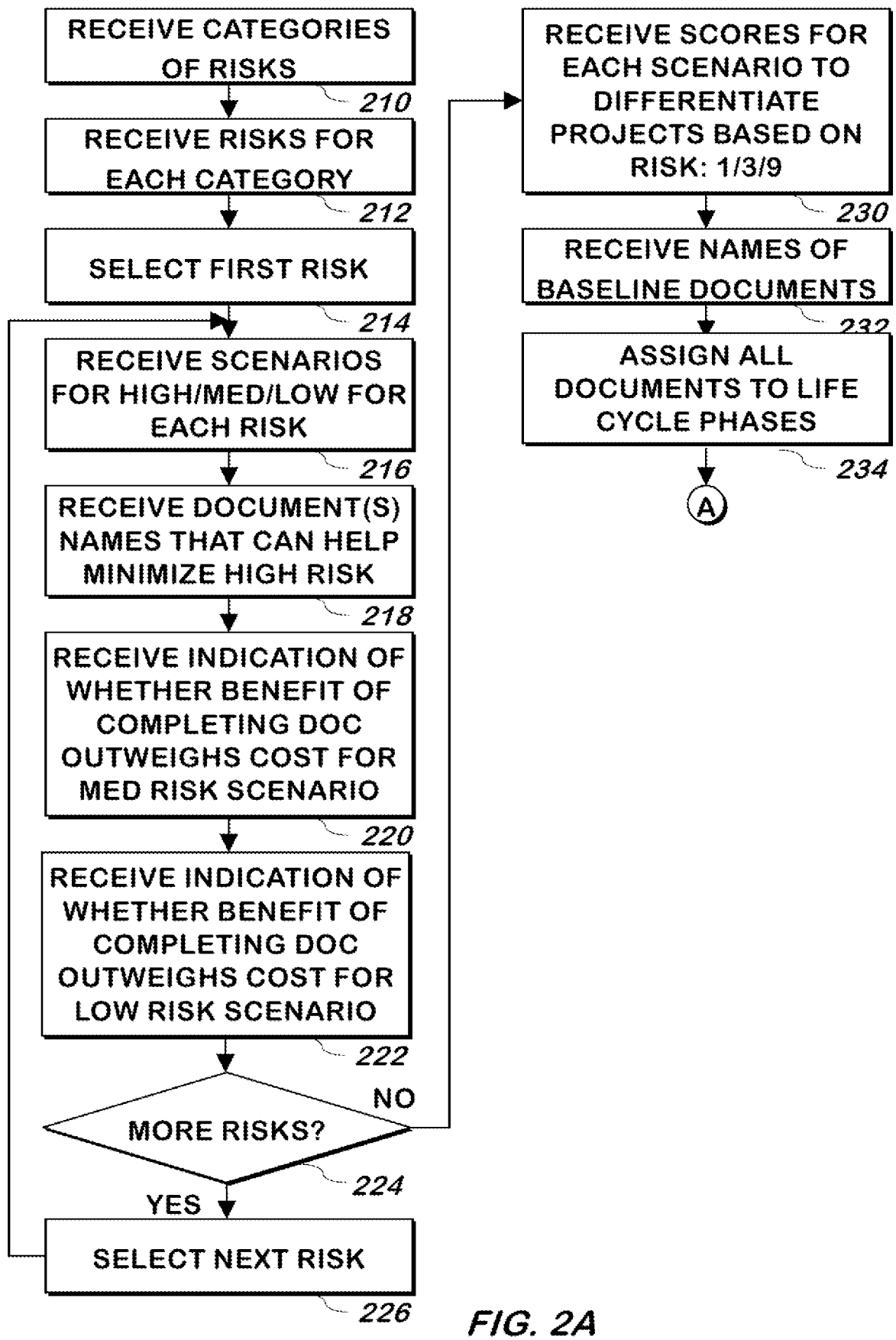
Figure 2B:
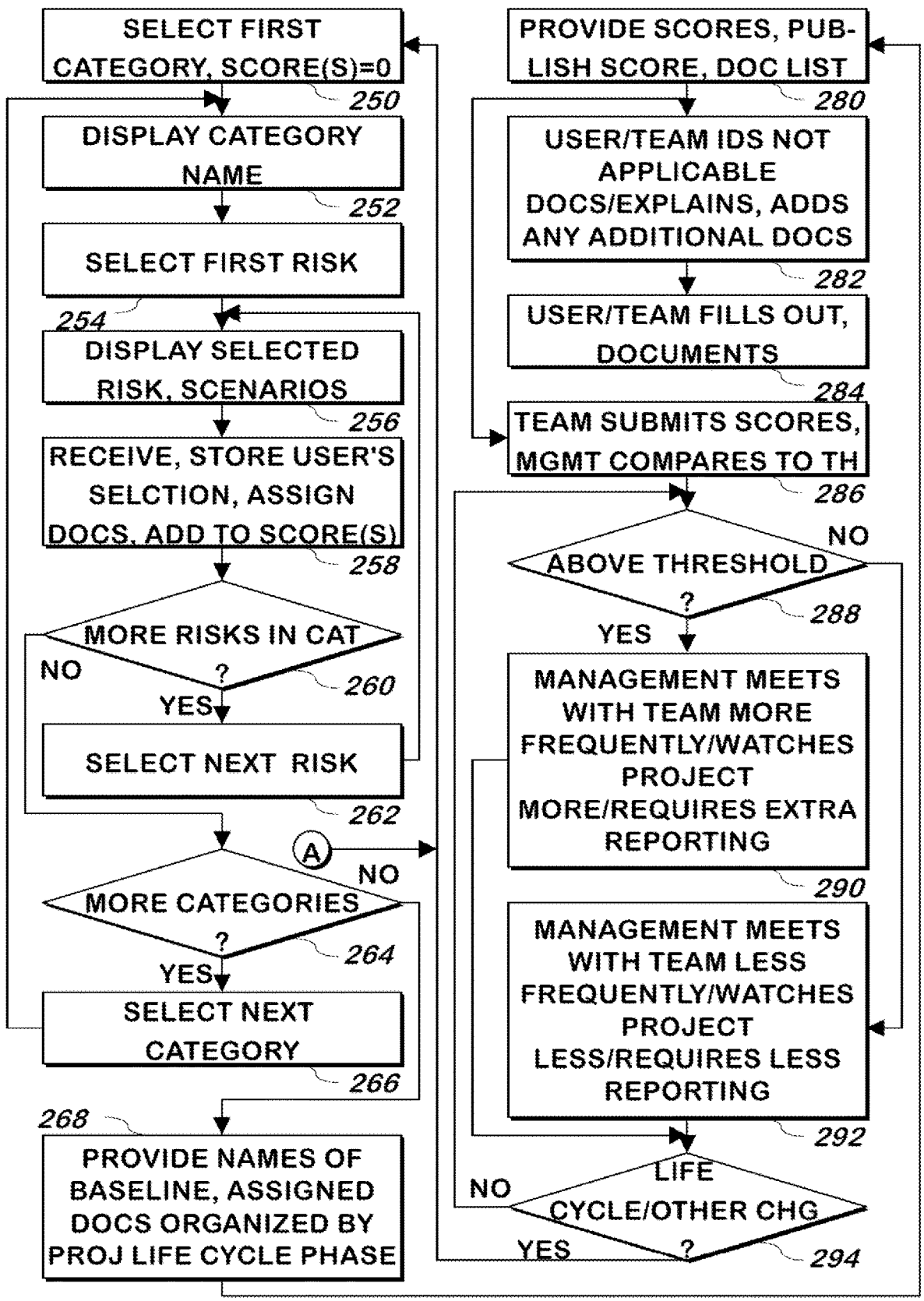

Referring now to FIG. 2, consisting of FIG. 2A and FIG. 2B, a method of containing project risk is shown according to one embodiment of the present invention.

Setup of Risks, Documents and Scores.

The names of several categories of risks are received 210. In one embodiment, the several categories of risks are identified by someone familiar with project management, and the several categories include categories that correspond to all possible risks of a project. In one embodiment, the categories are those shown in Appendix A.

For each category of risk received in step 210, the names of individual risks are received 212. The individual risks are risks of things that could go wrong with the project or could indicate a potential problem with the project.

A first of the risks received in step 212 is selected 214. Two or more scenarios are received 216 for the selected risk. Each scenario corresponds to a different level of risk and describes an aspect of a project that has the level of risk to which the scenario corresponds. For example, if the risk is funding, and the risk level is high the scenario could be "The project has no identified source of funding".

In one embodiment, there are three different scenarios for each risk, corresponding to high, medium and low levels of risk, and an optional fourth "not applicable" scenario that simply defaults to "N/A" for projects for which no explicit scenario is received. Other numbers of levels of risks may be used. Appendix A illustrates a set of risk categories, risks and scenarios, though other sets of these may be used.

One or more documents (or document names) are received 218 that can help contain the selected risk where the risk level is the highest of the levels described above.

Containing the risk may include identifying the causes of the risk, identifying solutions to the risk, identifying ways to minimize the effects of the risk or the risk itself, or identifying people who can help minimize the risk. In one embodiment, a document may apply to more than one risk. In addition, a risk may have one or more documents received as part of step 218.

An indication is received 220 that identifies whether the benefits associated with filling out the document of step 218 outweigh the costs of filling that document out where the risk is a different level than high, such as medium. An indication is received 222 that identifies whether the benefits associated with filling out the document of step 218 outweigh the costs of filling that document out where the risk is a different level than high risk level or the risk level corresponding to step 220. For example, the different risk level may be "low". In other embodiments, steps similar to steps 220 or 222 may be used for each risk level other than the N/A risk level. In one embodiment, the N/A risk level scenario is always considered to be one in which the benefits of completion of the document corresponding to the highest level of such risk are outweighed by the costs of completion. However, a user or team may disagree and add any such document into the list of documents for any given project, as described in more detail below.

If there are more risks 224, the next risk is selected 226 and the method continues at step 216 using the newly selected risk. If there are no more risks 224, the method continues at step 230.

At step 230, scores for each scenario of each risk are received. In one embodiment, the scores for each scenario corresponding to the same risk level are the same for every risk. That is, the scores for the scenarios corresponding to low levels of risk are '1' for every risk, the scores for the scenarios corresponding to medium levels of risk are '3' for every risk, and the scores for the scenarios corresponding to high levels of risk are '9' for every risk. The score for a not applicable risk may be zero. In other embodiments, the scenarios from the same level of risk for different risks use different scores. The individual scores are set up to allow projects with more risks at the highest level to generate much higher scores than ones with fewer risks at the highest level.

Names of baseline documents, those that should be used by all or most projects, (or the documents themselves) are received 232. Life cycle phases are assigned 234 to each of the documents whose names (or the documents themselves) were received as described above. Such documents include the documents or document names received in steps 218 and 232. Life cycle phases are names of life cycles of projects, such as "inception" "elaboration", "construction" and "transition", though other numbers and names of life cycles may be used.

Preparation of Development Case for a Specific Project.

Once the steps of FIG. 2A have been performed as described above, users may use the method of FIG. 2B to put together what is referred to as a "development case" for a project. A development case may be part of or all of a project methodology or project management process. The development case includes a list of the documents the development team will fill out to limit the risks of the project as described above, and a score, as will now be described. A user is described herein, although the user may in fact be several people or all people from a development team.

A first risk category is selected 250 from those received as described above, and the name of the category is displayed 252. In one embodiment, a risk score is initialized as zero as part of step 250, and will be added to as described in more detail below. In one embodiment, multiple category risk scores are used as described below, and a risk score for each category is also initialized to zero as part of step 250.

A list of documents is also initialized to contain the baseline documents as part of step 250. A first risk from the selected category is selected 254 from those received as described above, and the name of the risk is displayed 256, along with all of the scenarios received for the selected risk as described above.

The user selects one of the scenarios most closely matching the current state of the project for which the development case is being generated, and the user's selection is received and stored 258 associated with the selected risk. The score corresponding to the risk level of the scenario (and the risk) is added to the risk score, and the document or documents corresponding to the selected scenario, if any are added to a list of documents as part of step 258. In one embodiment, the score corresponding to the risk level of the selected scenario is also added to the score corresponding to the risk category as part of step 258. The document assigned to the highest risk level of a risk corresponds to the selected scenario if the selected scenario corresponds to the highest risk level of that risk, and corresponds to any other risk levels selected for the same risk if the benefit of filling out the document was indicated as being worth the cost of completion of such document at that risk level as described above.

If there are more risks in the selected category 260, the next risk in the selected category is selected 262 and the method continues at step 256 using the newly selected risk. If there are no more risks in the selected category 260, if there are more categories 264, the next category is selected 266, and the method continues at step 252 using the newly selected category. If there are no more categories 264, the method continues at step 268.

At step 268, the list of documents, assigned based on the scenarios chosen as well as from the set of baseline documents, is provided, for example, by displaying it or printing it. In one embodiment, the documents are organized by the life cycle phase to which they correspond, for example, listing the names of the phases in the order in which each phase typically occurs, and listing the documents from the baseline and from those corresponding to the user-selected scenarios that correspond to each phase under the name of the phase.

The score or scores are also provided, and the score or scores and document list are published as the development case 280. Publication may include distribution to interested and potentially interested parties. In one embodiment, publication of the development case is performed after step 282 instead of performing it before step 282. Steps 282 and 286 follow step 280.

At step 282, the user or team reviews the document list and the documents, and identifies those one or more documents that are listed on the development case that they feel they should not complete. The user or team indicates which documents they will not complete, and why they feel they should not complete them. In addition, the user or team may supply the names (or the documents themselves) of additional documents the user or team feels would be beneficial for containing one or more risks of the project or for other purposes. All such information is received as part of step 282 and stored as part of the development case.

The user or team fills out 284 the documents corresponding to the current life cycle phase that were not indicated as inapplicable as described above. Other documents not corresponding to the current life cycle phase may also be filled out, such as some or all of those corresponding to the upcoming life cycle phase.

The team submits 286 the score to a management team. In one embodiment, the list of documents, or the filled-out documents, are also submitted to the management team, or one or more of the filled-out documents may be submitted in response to a request from the management team, and the management team stores the score, associated with an identifier of the team. As part of step 286, the management team compares the score submitted with a threshold. The management team may include parties for whom the team members work, management of organizations who will benefit from the project, or other management of the organization or organizations that include any such person or group. For example, the management team may include a project governance or project oversight organization in a company.

If the score is above the threshold 288, the management team meets with the team more frequently, requires extra reporting (and optionally, the documents) and provides greater attention to the project 290 than if the score is below the threshold 288, 292. The method continues at step 294. There may be individual thresholds for each risk category and step 288 may also check for category scores above a threshold. If any category score is above a threshold or a minimum number of category scores are above their respective thresholds (each of which may be the same or different from one another and may be a function of the number of risks in the category), the "yes" branch of step 288 is taken.

At step 294, if the project transitions to a new life cycle phase, or there has been another significant change to the project for which a new assessment of risks and/or containment of such risks would be beneficial, the method continues at step 250, and otherwise 294, the method continues at step 288.

Any of the information flows described herein may occur over a computer network. Thus, the scenarios may be displayed over a network and selected via the network, or the development case may be provided to the user or team via a network. The applied purpose of the actions is to assist users in limiting (i.e. containing) one or more risks of a project.

System.

Figure 3:
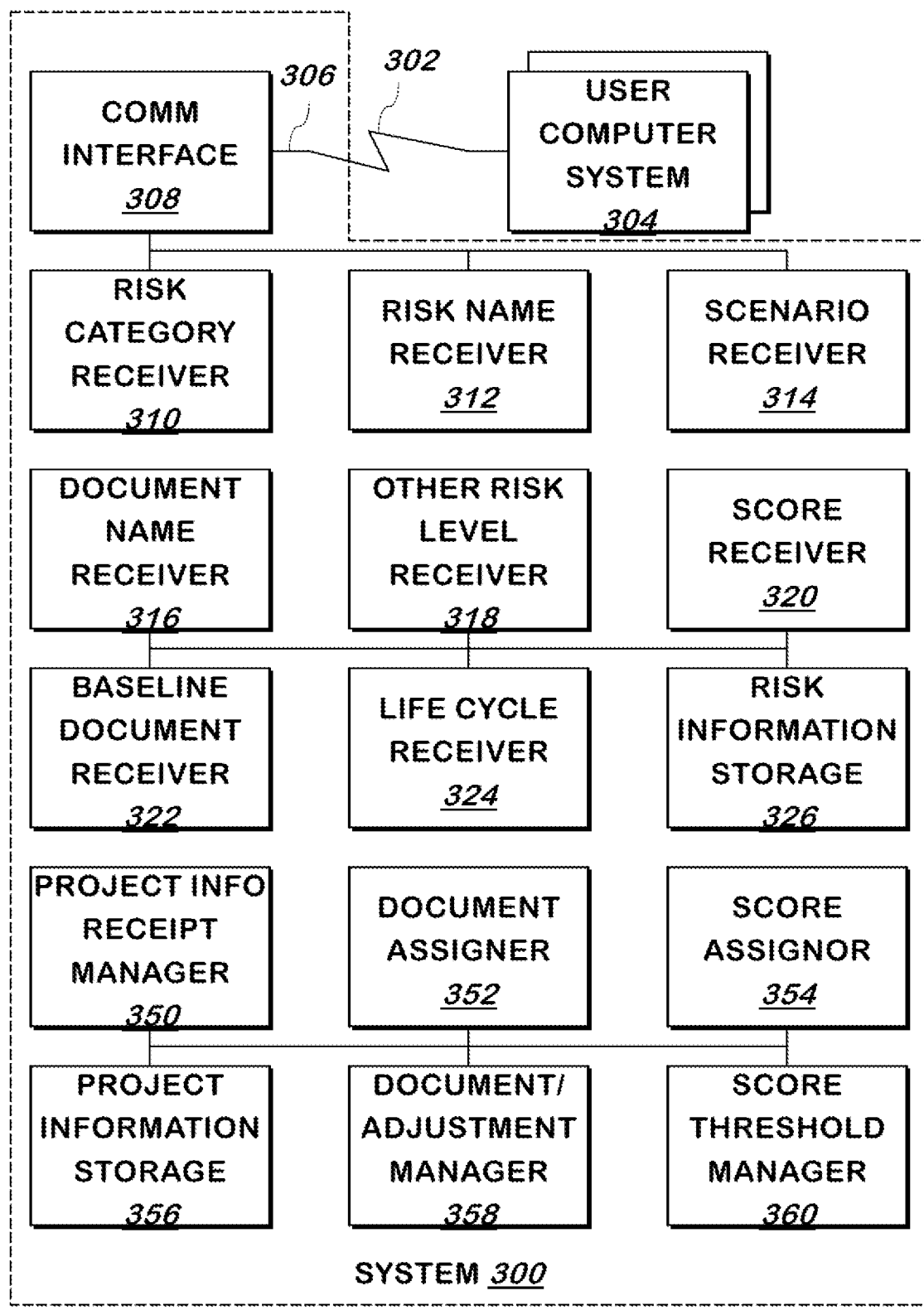
FIG. 3 is a block schematic diagram of a system for containing project risk according to one embodiment of the present invention.

Referring now to FIG. 3, a system 300 for containing the risk of a project is shown according to one embodiment of the present invention. In one embodiment, containing risk means identifying a level of risk and identifying steps that can be used to reduce the level of risk for risks that are at a high or medium level, or can be used to reduce the potential negative effects of that risk. The risk of a project is made of the component risks identified as described herein.

Communication interface 308 is a conventional communication interface that includes a conventional Ethernet interface running TCP/IP, Ethernet and other conventional communications protocols. All communication into or out of system 300 is made via input/output 306 of communication interface 308, which is coupled to a network 302, such as a local area network, the Internet, or both. Any other computer or other device 304 (of which there may be several) coupled to the Internet 302 may be used to provide or receive information as described herein.

System Setup.

An administrator of the system may use a user computer system 304 to set up the risk and document information as described herein. Risk category receiver 310 provides a user interface to the administrator that allows the administrator to enter the names of risk categories as described above, which risk category receiver 310 stores into risk information storage 326. After each risk category name has been so stored, risk category receiver 310 signals risk name receiver 312 with the name of the risk category just entered.

When it receives each risk category name, risk name receiver 312 provides a user interface that allows the administrator to enter the names of risks as described above, which risk name receiver 312 receives and stores into risk information storage 326 associated with the risk category name received that is stored therein. After each risk name has been so stored, risk name receiver 312 signals scenario receiver 314 with the name of the category and risk.

When it receives each risk category name and risk name, scenario receiver 314 prompts the administrator to enter two or more scenarios, each corresponding to a different level of risk, for example corresponding to a high, medium or low level of risk. In one embodiment, scenario receiver 314 also allows the administrator to indicate whether a "not applicable" level of risk can apply to the risk name it receives. Scenario receiver 314 stores the scenarios and the risk level to which each scenario corresponds into risk information storage 326, as well as the indication that the "not applicable" risk level can apply to the risk, each associated with the risk name it receives that is associated with the category name it receives.

Scenario receiver 314 then signals document name receiver 316 with the name of the risk and category it received as described above, and scenario receiver 314 receives the name of the document or the document for one or more documents that can be used to limit the risk received by scenario receiver 314 at the highest level, and stores the document or name into risk information storage 326, associated with the risk name and risk category. Document name receiver 314 signals other risk level identifier 318 with the name of the risk and category.

When so signaled, other risk level identifier 318 provides a user interface that allows the administrator to indicate the scenarios or levels of risk for which the benefits of completing the document received by document name receiver for the risk and category names exceed the cost of completing the document, and risk level identifier 318 stores in risk information storage 326 identifiers of such scenarios or levels, associated with the risk level name and risk name it received. Other risk level identifier 318 then provides the risk name and category name to risk name receiver 312, which allows the administrator to enter an additional risk name as described herein, or to indicate that no additional risks for the category are being entered, at which point risk name receiver 312 signals risk category receiver 310.

When signaled, risk category receiver 310 allows the administrator to enter information for an additional risk category, which is processed as described above, or to indicate that the system description is complete. If the administrator indicates that the description is complete, risk category receiver 310 signals score receiver 320.

When signaled, score receiver 320 receives the scores for each level of risk for each risk or for all risks, stores such scores into risk information storage 326 and signals baseline document receiver 322.

When so signaled, baseline document receiver 322 receives the names of the baseline documents as described above, and optionally the documents themselves, and stores the names, and optionally the documents, into risk information storage 326 as the baseline documents. Baseline document receiver 322 signals life cycle receiver 324.

When signaled, life cycle receiver 324 retrieves the names of the documents in risk information storage 326 and provides the user with a user interface that allows the system administrator to identify a life cycle phase name for each of the document names, and life cycle receiver 324 receives such information and stores the life cycle name associated with each document name in risk information storage 326. Life cycle receiver 324 also receives order information for each of the life cycle phase names, that identifies the order in which the phases occur in a project. Life cycle receiver 324 stores such information into risk information storage 326.

Production of a Development Case for a Project.

At any time, a user or project team may use their own user computer system 304 to request a user interface from project information receiver 350 (and to provide and receive the information described below) via network 302. When it receives such a request, project information receiver 350 provides a user interface to receive a project name, receives such project name and stores the project name into project information storage 356. Project information receiver 350 uses the information in risk information storage 326 to provide one or more user interfaces that perform the steps 250-266 except for assignment of the documents and addition to the score or scores described with respect to step 258. Project information receiver receives the user's or team's scenario selection for each risk and stores them associated with each risk name and the project name into project information storage 356. Project information receiver 350 provides the project name to document assignor 352 and to score assignor 354.

Document assignor 352 uses the information in risk information storage 326 and the information in project information storage 356 for the project whose name it receives to assign documents to a list of documents for the project as described above, and stores the names of the documents assigned for the project into project information storage 356 associated with the project name. When it has finished assigning the documents as described above, document assignor 352 signals document/adjustment manager 358 with the name of the project.

When it receives the project name, score assignor 354 uses the scenario selections in project information storage 356 and the scores in risk information storage 326 to assign a score to the project (and optionally to each category) as described above. Score assignor 354 stores the score into project information storage 356 associated with the project name it received. When it has completed identifying and storing the project score, score assignor 354 signals score threshold manager 360 with the score and the name of the project.

When it receives the score and the name of the project, score threshold manager 360 stores in project information storage 356 an indication as to whether the score exceeds a threshold associated with the project name, and optionally whether any of the category scores exceed their respective thresholds and whether a threshold number (e.g. one or more) of the category scores have been exceeded. In one embodiment, more than one threshold for the total score and for each category score may be used, and in such embodiment, score threshold manager 360, identifies the lowest threshold exceeded by the score.

Document/adjustment manager 358 retrieves from project information storage 356 the list of documents associated with the project name it receives, and displays the list of documents to the user or team. Document/adjustment manager 358 provides a user interface that allows the user to indicate which of the documents on the list they feel they should not complete, and the reasons for not completing them. The user interface provided by document/adjustment manager 358 also allows the user to add the names of documents to the list, as well as the documents themselves, in one embodiment. Document/adjustment manager 358 receives and stores in project information storage 356 such information, associated with the project name it received. When document/adjustment manager 358 has completed storing any such information (or receives an indication from the user that no such update is required because the list of documents generated as described above will be used without modification) document/adjustment manager 358 publishes the optionally-altered list of documents (including indications of any document that will not be completed and the reason for non completion), the score, and an indication as to whether the score exceeds the threshold, collectively referred to as the development case to management, team members and others, the identifiers (such as e-mail addresses) of which are received by document/adjustment manager 358 via a user interface it provides to the user or the team.

The development case score or scores and the indication as to whether it exceeds the threshold are used by the management team as described above. In one embodiment, if the score exceeds the threshold or the threshold number of category scores exceed their respective thresholds, score threshold manager 360 arranges one or more meetings that would not have been arranged if the score had not exceeded the threshold, for example, via a central meeting server (not shown) coupled to the network and sends notices of the one or more meetings via e-mail, using the network.

As noted above, the user or team may use the system 300 to provide or update the scenarios corresponding to the project at different points in time corresponding to different life cycle phases, and a new list of documents and score or scores are assigned to each life cycle phase as described above. The scores and document assignments may be different for each life cycle phase.

Thus, documents names for high risk levels are provided for each risk. An indication is also received for each risk and the risk level, except the highest risk level, for which the document should also be used. The scenarios each correspond to a level for a risk, and apply to projects generally. Some risks will have no indications, other risks will have indications for some risk levels other than the highest, and still other risks will have indications for all levels except the "Not Applicable" level. The system and method matches the identified scenario for a project to the document or documents identified, if any, for the level of that risk to which the identified scenario corresponds.

As used herein, a "name" is an "identifier" and they are used interchangeably.

APPENDIX A

Categories, Risks and Scenarios

| Risk Category | | Risk | HIGH | MEDIUM | LOW | N/A |
|---|---|---|---|---|---|---|
| Sponsorship | | | | | | |
| | 1 | # of enterprises with shared accountability | Multiple enterprises with critical interest | "More than one enterprise, but one group taking accountability/ownership" | "Single enterprise, self-contained" | |
| | 2 | Clarity regarding Accountable Executive | Accountable Executive not assigned | Role is in question due to organizational or other changes | AE actively engaged | |
| | 3 | Accountable Executive engagement | AE not regularly available or responsive to critical project needs | AE inconsistently available but has assigned delegate | AE available and acts as advocate for project | |
| | 4 | Key stakeholder engagement | Stakeholders not identified or not engaged | Stakeholders identified but participation is inconsistent | AE stakeholders identified and actively engaged | |
| Benefits | | | | | | |
| | 5 | Clarity of project vision/objectives | End state objective not well defined | End state objective reasonably defined | End state objective clear and well defined | |
| | 6 | Degree to which benefits are measurable | Majority are soft benefits and not measurable | Some but not all critical benefits can be reliably quantified | Clear and measurable benefits expressed in terms of direct impact to revenue or cost | |
| | 7 | Sensitivity of benefits realization | "Benefits realization is sensitive to multiple volatile external factors, such as competitor activity or market swings" | "Benefits realization is sensitive to external factors, but those factors tend to be fairly predictable" | Benefits realization is not sensitive to external factors | |

APPENDIX A-continued

Categories, Risks and Scenarios

| Risk Category | | Risk | HIGH | MEDIUM | LOW | N/A |
|---|---|---|---|---|---|---|
| | 8 | Incremental ongoing business or technical support needed as result of project | Required FOEX is not yet understood | Required FOEX is understood but not yet planned and approved | FOEX is planned and approved | This project will not result in any need for ongoing support. |
| Requirements | | | | | | |
| | 9 | Consensus amongst multiple stakeholders | Key stakeholders have conflicting requirements AND priorities | Keystakeholders have conflicting requirements OR priorities | Feature-level requirements have been baselined and prioritized by all key stakeholders | |
| | 10 | Clarity of documented requirements | Complex requirements with many outstanding questions | Complex requirements but seem to be well understood by design team | Requirements are explicit enough to create target architecture | |
| | 11 | AFTER INCEPTION: Stability of documented requirements | Requirements are changing frequently | "Requirements are changing, but infrequentiy and changes are minor" | Requirements have entered change control | Project has not yet left Inception |
| | 12 | AFTER INCEPTION: Completeness of documented requirements | High Risk requirements are not yet defined | "High Risk requirements have been defined, but supplementary requirements are outstanding" | Core project team is highly confident that requirements are complete and comprehensive | Project has not yet left Inception |
| Timeline | | | | | | |
| | 13 | Date Drivers | """Top Down"" project dates pre-set and immovable" | "Project has date drivers, but they are flexible and/or achievable" | Project dates driven by tasks and resources | |
| | 14 | Project Duration | Duration >18 months | Duration between 9-18 months | Duration <9 months | |
| | 15 | AFTER INCEPTION: Scope of project milestones | Milestones are extremely broad and require significant work before progress can be accurately measured | "Milestones are broad but team has realistic plan to achieve more frequent, well defined milestones" | "Milestones are discrete, well defined and frequent" | Project has not yet left Inception |
| Cost | | | | | | |
| | 16 | Project Size | Cost >$3 M | Cost between $1 M-$3 M | Cost <$1 M | |
| | 17 | AFTER INCEPTION: Accuracy of estimation | Project team is unable to commit to estimate within 50% variance | Project team is confident in estimate within 50% variance | Project team is confident in estimate within 10% variance | Project has not yet left Inception |
| | 18 | Funding stability | Funding is less than required OR there is high probability of losing funds to another priority effort | Funding is marginally adequate and expected to remain relatively stable | Funding includes risk contingency and is highly certain to remain available | |
| Exposure | | | | | | |
| | 19 | Brand Risk | "High external profile due to marketing efforts, media coverage or competitor activities" | "External attention with little brand risk, but potentially significant client impact." | External attention unlikely | |
| | 20 | Regulatory requirements | High external profile due to regulatory requirements | Moderate external profile due to regulatory requirements | Regulatory standards suggested but not required | There are no regulatory standards or requirements impacting this project. |

APPENDIX A-continued

Categories, Risks and Scenarios

| Risk Category | | Risk | HIGH | MEDIUM | LOW | N/A |
|---|---|---|---|---|---|---|
| | 21 | Access mechanisms to Customer Data/Fraud Control | Project will modify or create an unencrypted access mechanism to customer information. | Project will modify or create an encrypted access mechanism to customer information. No data transmission or ISS has approved an encrypted transmission. | No access mechanisms to customer information will be created or modified. | This project does not involve data of any kind. |
| Resources | | | | | | |
| | 22 | Availability of Subject Matter Experts (SMEs) | SMEs are committed elsewhere and/or overbooked | "SME commitment varies, but most current availability requirements are being met" | SMEs are committed to the project and actively involved | |
| | 23 | End user involvement | User availability inconsistent | Knowledgeable users available as consultants only | "Highly knowledgeable users fully committed to project, with backfill if required" | |
| | 24 | Availability of specialized resources | "Legal, compliance or other highly specialized resources are not available or have not been consulted" | "Legal, compliance or other highly specialized resources are aware of but not committed to project" | "Legal, compliance or other highly specialized resources are fully committed to project" | "This project does not require any legal, compliance or other highly specialized resources." |
| | 25 | Team project experience | Core project team is relatively new to managing projects of this complexity | Core project team is experienced but project complexity may be a stretch for them | Core project team has significant project experience relative to project complexity | |
| | 26 | Project Team Staffing (Expertise and Availability) | Many resources assigned to key roles do not meet the project's requirements for expertise in the role OR Many key roles are unfilled or filled by resources with low/inconsistent availability | At least one resource assigned to a key role does not meet the project's requirements for expertise in the role OR at least one key role is unfilled or filled by a resource with low/inconsistent availability | All key roles are filled by resources with adequate availability and whose level of expertise in the role meets the project's requirements | |
| | 27 | Conflicting priorities | Critical resources shared with other high priority efforts | "Contention exists, however project is expected to be priority" | Keyresources are dedicated with little risk of contention | |
| | 28 | Skill backup for role turnover | Project has a high dependency on limited resources with critical/specialized skill or expertise and no resource contingency plan | Project has moderate dependency on limited resources with critical/ specialized skill or expertise and no resource contingency plan | Project has little dependency on limited resources with critical/ specialized skill or expertise OR a comprehensive resource contingency plan is in place | |
| 3rd Party | | | | | | |
| | 29 | Vendor history | Vendor is less than 2 years old OR has no relevant experience at Schwab OR there are outstanding | "Vendor has history with Schwab, but not in project area OR there are potential issues with the contract/ relationship" | "Vendor is industry leader and has ongoing, successful history with Schwab, with interaction | This project will not utilize a vendor of any type. |

APPENDIX A-continued

Categories, Risks and Scenarios

| Risk Category | Risk | HIGH | MEDIUM | LOW | N/A |
|---|---|---|---|---|---|
| | | issues with vendor that require resolution | | models firmly established" | |
| | 30 Due Diligence process | "Only one vendor was an option, and vendor due diligence was not performed" | Formal selection amongst multiple vendors was bypassed due to prior track record | An extensive selection process was conducted and appropriate screening completed. | This project will not utilize a vendor of any type. |
| | 31 Offshore vendor | "Offshore team, including development lead, is inexperienced with Schwab and the project deliverablesare complex and potentially ambiguous." | Offshore team is inexperienced with Schwab but the project deliverable is standard OR the project deliverable is complex/ ambiguous but the offshore team is experienced with Schwab | "Offshore team, including the development lead, is experienced with Schwab AND the project deliverable is standard technology" | This project will not utilize any offshore resources. |
| User Experience | | | | | |
| | 32 Impact on client | Project will have significant impact (positive or negative) on client interaction with Schwab | Project will have minor impact (positive or negative) on client interaction with Schwab | Project will have no impact on client interaction with Schwab | |
| | 33 AFTER ELABORATION: User readiness for adoption | Users are resistant | Users are ambivalent | Users fully prepared for and supportive of change | Project has not yet left Elaboration |
| | 34 New functionality or process creates impact on internal user | Requires new business rules and policies | Requires modified business rules and policies | No new business rules or policies | |
| Interdependencies | | | | | |
| | 35 Number of technology groups involved | "Multiple technology providers are involved, with shared accountability for project deliverables" | "Multiple technology providers involved, with one group taking clear accountability" | Project is contained within one technology provider | This project does not involve a technical solution. |
| | 36 Dependencies on other projects | Predecessor project(s) unable to commit to required delivery | Predecessor project(s) on track but no slack is available | Predecessor project(s) are on track to deliver with plenty of slack | This project has no dependencies on any other project. |
| | 37 Dependencies on other release schedules | Releases are infrequent or inflexible OR inclusion is problematic | Release inclusion is planned but not confirmed | "Release schedules are frequent and/or flexible, inclusion is planned" | This project has no dependencies on any other release schedules. |
| | 38 Dependencies on external factors | Critical decisions such as regulatory decisions and/or deadlines are highly uncertain | Critical decisions such as regulatory decisions and/or deadlines are shifting | Critical decisions such as regulatory decisions and/or deadlines are clear and confirmed | This project has no dependencies on any external factors. |
| Methodology | | | | | |
| | 39 Team experience with standard methodology | Team is unfamiliar with standard and processes | Team is trained but inexperienced with standard methodology | All team members have training and experience with standard processes | |

APPENDIX A-continued

Categories, Risks and Scenarios

| Risk Category | | Risk | HIGH | MEDIUM | LOW | N/A |
|---|---|---|---|---|---|---|
| | 40 | Support for standard methodology and tools | Circumstances such as aggressive timeline preclude use of standard tools and processes | Standard tools and processes are applied to some but not all parts of project OR were applied midstream | Standard tools and processes are being applied in all parts of project | |
| | 41 | Level of governance adherence | Standard governance processes are not being adhered to | Some but not all standard governance processes are being adhered to | All standard governance processes are being adhered to | |
| Implementation | | | | | | |
| | 42 | Unproven technology/ Experience with delivering within Schwab business conditions | No track record of implementing this system in the industry with comparable volumes or configuration | Solution has been implemented elsewhere with moderately comparable volumes and configuration | Proven track record of implementing system at Schwab or in industry with comparable volumes and configuration | This project does not involve a technical solution. |
| | 43 | AFTER INCEPTION: Staged Deployment | High risk functionality deployed last | Enough high risk functionality deployed early to extrapolate viability of entire solution | Deployment plan implements high risk functionality early | Project has not left Inception |
| | 44 | Complexity of integration with existing technology | Significant reliance or integration with existing systems | Moderate reliance on existing systems or data | Little or no reliance or integration with existing systems | This project does not involve a technical solution. |
| Technical Design | | | | | | |
| | 45 | AFTER INCEPTION: Degree of product customization | Vendor product will require significant customization | Vendor product will require moderate customization | Vendor product will meet requirements with out of the box functionality | This project will not utilize a vendor product. |
| | 46 | Team familiarity with technology | Solution is new to the core technical team andresources experienced with implementing it at Schwab are NOT available for consulting | Solution is new to the core technical team but resources experienced with implementing it at Schwab are available for consulting | Core technical team has experience with implementing the solution | This project does not involve a technical solution. |
| | 47 | Conformance to Schwab Technology standards | Solution requires significant negotiation with Schwab's technology governance | Solution presents minor exceptions to Schwab's technology standards | Solution conforms to Schwab's technology standards | This project does not involve a technical solution. |
| Technical Environment | | | | | | |
| | 48 | Team experience with development tools | Team is inexperienced with required tools and Schwab has no current support | "Team is inexperienced with required tools, but well supported at Schwab" | Team is experienced with development required tools for project | This project does not involve a technical solution. |
| | 49 | Experience testing technology | Ability to perform full testing is uncertain OR team is inexperienced at testing solution | Testing resources have experience testing some but not all of the solution in the Schwab environment | Testingr esources have experience testing this solution in the Schwab environment | This project does not involve a technical solution. |

APPENDIX A-continued

Categories, Risks and Scenarios

| Risk Category | Risk | HIGH | MEDIUM | LOW | N/A |
|---|---|---|---|---|---|
| 50 | Stability of environment | Test OR Development environment is unstable OR significant contention with other testing efforts exists. | Test and development environments are mainly stable but some contention with other efforts exists | Test and development environments are stable and reserved to project | This project does not involve a technical solution. |

What is claimed is:

1. A method of configuring a meeting server to set up a meeting, comprising:
 receiving, at a computer system coupled to a memory system, names for each of a plurality of risk categories, and, for each of the risk categories in the plurality, names of each of a plurality of risks;
 receiving, at the computer system comprising a hardware computer processor coupled to the memory system, for each of the risks, a plurality of scenarios, each scenario corresponding to a different one of a plurality of levels of said risk;
 receiving, at the computer system coupled to the memory system, and storing on a tangible electronic media a first plurality of document names, for each of the first plurality of document names:
  an identifier of at least one risk for which a document corresponding to said document name is able to contain said at least one risk at a highest of the plurality of levels; and
  for each of at least some of the plurality of levels of said at least one risk other than the highest of the plurality of levels, an indication of whether risk containment benefits of completing the document corresponding to said document name for a project having a risk at the said level of risk other than the highest of the plurality of levels is worth an effort of completing said document;
 receiving, at the computer system coupled to the memory system, for each of the plurality of risks, an identifier of one of the plurality of scenarios for said risk that most closely corresponds to a project;
 for each of the plurality of risks for which the scenario of the received identifier corresponds to the highest of the plurality of levels of risk, assigning, at the computer system coupled to the memory system, to the project by a hardware processor at least one document name received for which the document corresponding to the document name was indicated as being able to contain said risk at the highest of the plurality of levels;
 for each of the plurality of risks for which the received identifier of the scenario corresponding to the project corresponds to one of the plurality of levels of risk that is other than the highest of the plurality of levels of risk according to the tangible electronic media, assigning, at the computer system coupled to the memory system, to the project any document names for which the indication was received that the risk containment benefits of completing the document corresponding to the document name is worth the effort of completing said document at said risk level;
 providing, from the computer system coupled to the memory system, the at least one document name assigned;
 assigning a score responsive to the plurality of risk names, and for each risk name, the identifier of the scenario for said risk; and
 causing a meeting server having an input coupled to a score threshold manager output to arrange a meeting responsive to the score exceeding a threshold.

2. The method of claim 1, additionally comprising repeating, at the computer system coupled to the memory system, the steps of the method of claim 1 responsive to a change in a life cycle phase of the project.

3. The method of claim 1:
 wherein the at least one document name is provided to a user; and
 additionally comprising receiving, after the at least one document name assigned is provided to the user, at least one document name assigned that should not be completed.

4. The method of claim 1:
 wherein the at least one document name is provided to a user; and
 additionally comprising receiving at least one additional document name of an additional document that should be completed and is not one of the document names assigned, after the at least one document name assigned is provided to the user.

5. The method of claim 4, wherein the additional document name does not correspond to a document corresponding to a document name received.

6. A system for configuring a meeting server to set up a meeting, comprising:
 a risk category receiver comprising a hardware computer processor system coupled to a memory system, and having an input for receiving names of a plurality of risk categories, the risk category receiver for providing the plurality of risk category names at an output;
 a risk name receiver comprising the hardware computer processor system coupled to the memory system, and having an input coupled to the risk category receiver output, the input additionally for receiving, for each of the risk categories in the plurality, names of each of a plurality of risks, the risk name receiver for providing the risk names at an output;
 a scenario receiver comprising the hardware computer processor system coupled to the memory system, and having an input coupled to the risk category receiver output for receiving the risk category names and to the risk name receiver output for receiving the plurality of risk names, and additionally for receiving for each of the risks, a plurality of scenarios, each scenario corresponding to a different one of a plurality of levels of said risk, the scenario receiver for providing the plurality of scenarios, associated with the risk names at an output;

a document name receiver comprising the hardware computer processor system coupled to the memory system, and having an input for receiving a plurality of document names, and for each of the plurality of document names, a name of at least one risk for which a document corresponding to said document name is able to contain said at least one risk at a highest of the plurality of levels, the document name receiver for providing at an output coupled to an electronic storage system the plurality of document names and the name of said risk corresponding to each document name received at the document name receiver input;

an other risk level receiver comprising the hardware computer processor system coupled to the memory system, and having an input for receiving a name of a risk and, for each of at least some of the plurality of levels of said at least one risk other than the highest of the plurality of levels, an indication of whether risk containment benefits of completing the document corresponding to said document name for a project having a risk at the said level of risk other than the highest level is worth an effort of completing said document, the other risk level receiver for providing at an output coupled to the electronic storage system said risk name, and an identifier of each of said at least some of the plurality of levels;

a project information receipt manager comprising the hardware computer processor system coupled to the memory system, and having an input coupled to the risk name receiver for receiving the plurality of risk names, and for receiving for each of the plurality of risks, an identifier of one of the plurality of scenarios for said risk that most closely corresponds to a project, the project information receipt manager for providing at an output the plurality of risk names, and for each risk name, the identifier of the scenario for said risk received at the project information receipt manager input;

a document assignor comprising the hardware computer processor system coupled to the memory system, and having an input coupled to the project information receipt manager output via the electronic storage system for receiving the plurality of risk names and identifiers of the scenario for the risk corresponding to the risk name, to the document name receiver output via the electronic storage system for receiving the plurality of document names and the name of said risk corresponding to each document name, and to the other risk level receiver output for receiving the risk name, and an identifier of each of said at least some of the plurality of levels, the document assignor for:

for each of the plurality of risks for which the scenario of the received identifier corresponds to the highest of the plurality of levels of risk, assigning to the project at least one document name received for which the document corresponding to the document name was indicated as being able to contain said risk at the highest of the plurality of levels;

for each of the risk names and identifiers of the scenarios received from the project information receipt manager that correspond to at least one of a set of risk names, and identifiers of each of said at least some of the plurality of levels received from other risk level receiver, assigning to the project any document names received from the document name receiver for said risk; and providing at an output at the least one document name assigned;

a score assignor having an input coupled to the project information receipt manager output, for receiving the plurality of risk names, and for each risk name, the identifier of the scenario for said risk, the score assignor for assigning a score responsive to the plurality of risk names, and for each risk name, the identifier of the scenario for said risk, and for providing the score at an output; and a score threshold manager having an input coupled to the score assignor output for receiving the score, the score threshold manager for causing the meeting server having an input coupled to the score threshold manager output to arrange a meeting responsive to the score exceeding a threshold.

7. The system of claim 6, wherein:

the project information receipt manager receives the identifier of one of the plurality of scenarios for each of the plurality of risks that most closely corresponds to the project at a first point in time, and additionally receives an identifier of one of the plurality of scenarios for each of the plurality of risks that most closely corresponds to the project at a second point in time, the second point in time corresponding to a change in life cycle phase from the first point in time; and the document assignor is additionally for:

assigning to the project at least one document name received for which the document corresponding to the document name was indicated as being able to contain said risk at the highest of the plurality of levels for each of the plurality of risks for which the scenario identifier for the second point in time was received at a document assignor input indicating that the scenario corresponding to the highest of the plurality of levels of risk most closely corresponds to the project;

assigning to the project for the second point in time any document names received from the document name receiver for said risk for each of the risk names and identifiers of the scenarios received from the project information receipt manager for the second point in time that correspond to at least one of a set of risk names, and identifiers of each of said at least some of the plurality of levels received from other risk level receiver; and providing at the document assignor output at least one document name assigned for the second point in time.

8. The system of claim 6:

wherein the at least one document name is provided to a user;

additionally comprising a document adjustment manager comprising the hardware computer processor system coupled to the memory system, and having an input for receiving from the user, after the at least one document name assigned is provided to the user, at least one document name assigned that will not be completed, the document adjustment manager for providing at an output the at least one document name assigned that will not be completed.

9. The system of claim 6:

wherein the at least one document name is provided to a user; and additionally comprising a document adjustment manager comprising the hardware computer processor system coupled to the memory system, and having an input for receiving at least one additional document name of an additional document that should be completed and is not one of the document names assigned, after the at least one document name assigned is provided to the user, the document adjustment manager for providing at an output the at least one document name.

10. The system of claim 9, wherein the additional document name does not correspond to a document corresponding to a document name received.

11. A computer program product comprising a nontransitory computer useable medium having computer readable program code embodied therein for configuring a meeting server to set up a meeting, and comprising computer readable program code devices configured to cause a computer system coupled to a memory system to:

receive, at the computer system coupled to the memory system, names for each of a plurality of risk categories, and, for each of the risk categories in the plurality, names of each of a plurality of risks;

receive, at the computer system comprising a hardware computer processor coupled to the memory system, for each of the risks, a plurality of scenarios, each scenario corresponding to a different one of a plurality of levels of said risk;

receive, at the computer system coupled to the memory system, and storing on a tangible electronic media a first plurality of document names, and for each of the first plurality of document names:

an identifier of at least one risk for which a document corresponding to said document name is able to contain said at least one risk at a highest of the plurality of levels; and for each of at least some of the plurality of levels of said at least one risk other than the highest of the plurality of levels, an indication of whether risk containment benefits of completing the document corresponding to said document name for a project having a risk at the said level of risk other than the highest level is worth an effort of completing said document;

receiving, at the computer system coupled to the memory system, for each of the plurality of risks, an identifier of one of the plurality of scenarios for said risk that most closely corresponds to a project;

for each of the plurality of risks for which the scenario of the received identifier corresponds to the highest of the plurality of levels of risk, assigning, at the computer system coupled to the memory system, to the project by a hardware processor at least one document name received for which the document corresponding to the document name was indicated as being able to contain said risk at the highest of the plurality of levels;

for each of the plurality of risks for which the received identifier of the scenario corresponding to the project corresponds to one of the plurality of levels of risk that is other than the highest of the plurality of levels of risk according to the tangible electronic media, assign, at the computer system coupled to the memory system, to the project any document names for which the indication was received that the risk containment benefits of completing the document corresponding to the document name is worth the effort of completing said document at said risk level;

provide, from the computer system coupled to the memory system, the at least one document name assigned;

assign a score responsive to the plurality of risk names, and for each risk name, the identifier of the scenario for said risk; and cause a meeting server having an input coupled to a score threshold manager output to arrange a meeting responsive to the score exceeding a threshold.

12. The computer program product of claim 11, additionally comprising computer readable program code devices configured to cause the computer system to repeat, at the computer system coupled to the memory system, the steps of the method of claim 1 responsive to a change in a life cycle phase of the project.

13. The computer program product of claim 11:
wherein the at least one document name is provided to a user; and
additionally comprising computer readable program code devices configured to cause the computer system to receive, after the at least one document name assigned is provided to the user, at least one document name assigned that should not be completed.

14. The computer program product of claim 11:
wherein the at least one document name is provided to a user; and
additionally comprising computer readable program code devices configured to cause the computer system to receive at least one additional document name of an additional document that should be completed and is not one of the document names assigned, after the at least one document name assigned is provided to the user.

15. The computer program product of claim 14, wherein the additional document name does not correspond to a document corresponding to a document name received.

* * * * *